United States Patent
Neu et al.

(10) Patent No.: US 8,577,506 B2
(45) Date of Patent: Nov. 5, 2013

(54) METHOD FOR CONDITIONING A CONTROL VALVE

(75) Inventors: Andreas Neu, Kuhardt (DE); Ralph Gronau, Wetter (DE); Holger Kollmann, Mainhausen (DE); Peter Leska, Dietzenbach (DE); Jörg Berntheusel, Neu-Anspach (DE); Tobias Franke, Königstein (DE); Michel Wagner, Darmstadt (DE); Jusuf Muratoski, Mühlheim (DE); Artur Kost, Bad Soden (DE); Dieter Burkhard, Bingen-Büdesheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 289 days.

(21) Appl. No.: 12/865,191

(22) PCT Filed: Jan. 8, 2009

(86) PCT No.: PCT/EP2009/050178
§ 371 (c)(1),
(2), (4) Date: Jul. 29, 2010

(87) PCT Pub. No.: WO2009/095287
PCT Pub. Date: Aug. 6, 2009

(65) Prior Publication Data
US 2010/0332038 A1 Dec. 30, 2010

(30) Foreign Application Priority Data
Jan. 30, 2008 (DE) .......................... 10 2008 006 653

(51) Int. Cl.
*G05D 7/00* (2006.01)

(52) U.S. Cl.
USPC .......................................................... 700/282

(58) Field of Classification Search
USPC ........................................................... 700/285
See application file for complete search history.

(56) References Cited

U.S. PATENT DOCUMENTS 6,962,164 B2 * 11/2005 Lull et al. ........................... 137/2
7,979,165 B2 * 7/2011 Gotoh et al. .................. 700/282
(Continued)

FOREIGN PATENT DOCUMENTS

DE 198 48 960 A1 4/2000
DE 102 24 059 A1 8/2003
(Continued)

*Primary Examiner* — Mohammad Ali
*Assistant Examiner* — Sivalingam Sivanesan
(74) *Attorney, Agent, or Firm* — RatnerPrestia

(57) ABSTRACT

A control valve conditioning method in an electrohydraulic pressure control unit comprising at least one electrically triggered solenoid valve that is controlled in an analog manner. The solenoid valve is operated at a specific operating current according to a functional correlation or characteristic diagram between the valve current and the differential pressure characteristic curve when the pressure is controlled, said functional correlation or characteristic diagram being stored in the pressure control unit. The method comprises the following steps: a) temporarily applying at least one anti-hysteresis pulse to the solenoid valve during which a current is set far below or far above the operating current in the valve; b) applying the anti-hysteresis pulse at the desired operating current before or during controlled operation, and c) applying the anti-hysteresis pulse wherein the duration is limited in such a way that the anti-hysteresis pulse has largely no influence on the brake pressure.

11 Claims, 3 Drawing Sheets

(56) References Cited

U.S. PATENT DOCUMENTS

| | | | |
|---|---|---|---|
| 2004/0206155 A1* | 10/2004 | Sosnowski | 73/1.72 |
| 2005/0082905 A1 | 4/2005 | Gronau et al. | |
| 2005/0168061 A1 | 8/2005 | Scheller et al. | |
| 2007/0158607 A1* | 7/2007 | Fey et al. | 251/129.16 |
| 2007/0215206 A1 | 9/2007 | Lull et al. | |
| 2007/0252098 A1* | 11/2007 | Schmidt et al. | 251/129.01 |
| 2010/0090521 A1* | 4/2010 | Loos | 303/20 |
| 2010/0219026 A1* | 9/2010 | Fukasawa et al. | 188/72.1 |

FOREIGN PATENT DOCUMENTS

| | | |
|---|---|---|
| DE | 103 41 027 A1 | 3/2004 |
| DE | 10 2004 008 796 A1 | 11/2004 |
| DE | 10 2007 019 732 A1 | 12/2007 |
| EP | 1 474 319 B1 | 11/2004 |
| FR | 2 545 628 | 11/1984 |

* cited by examiner

METHOD FOR CONDITIONING A CONTROL VALVE

CROSS REFERENCE TO RELATED APPLICATIONS

This application is the U.S. national phase application of PCT International Application No. PCT/EP2009/050178, filed Jan. 8, 2009, which claims priority to German Patent Application No. 10 2008 006 653.2, filed Jan. 30, 2008, the contents of such applications being incorporated by reference herein.

FIELD OF THE INVENTION

The invention relates to a control valve conditioning method in an electrohydraulic pressure control unit having at least one electrically actuated solenoid valve which is controlled in an analog manner and is operated at a specific operating current, which is in the pressure control range of the application of the valve, during a pressure control operation.

BACKGROUND OF THE INVENTION

DE 103 41 027 A1, which is incorporated herein by reference, discloses a method for inter-vehicle distance control (ACC) for a motor vehicle, which method can be carried out in or with a two-circuit ABS/ESP brake control device which is commonly used with a pump. In order to meter the hydraulic brake pressure, an electrically actuable hydraulic isolating valve which is controlled in an analog manner is used, said isolating valve permitting, in contrast to control with an inlet valve which is actuated in an analog manner, pressure control throughout the brake circuits. The hydraulic valves used for pressure control are generally so-called analog/digital valves (A/D valves) which substantially correspond to conventional electromagnetic (solenoid) switching valves, but said analog/digital valves being actuated by means of a pulse-width-modulated current (PWM) in such a way that the valve tappet assumes a floating position. Pressure control is possible in this way provided that the current is actuated in a sufficiently accurate and reproducible manner. This is generally possible without major problems if the pressure to be adjusted can be adjusted by means of a pressure sensor in conjunction with a control loop. It is considerably more difficult to carry out a corresponding analog control method without a pressure sensor in the pressure circuit to be controlled. In this case, stored valve characteristic curves are usually used, these permitting, in conjunction with control methods which are known per se, the pressure to be set in the wheel without additional wheel pressure sensors.

The valve characteristic curve mentioned above therefore permits the pressure to be set by the valve in accordance with a pressure requirement which is applied to the controller, as an input variable. In this connection, DE 103 41 027 A1 mentions the problem that the dead space of the hydraulics, for example the air gap between the brake lining and brake disk, can lead to uncomfortable control during inter-vehicle distance control operation. As a solution to this problem, said application proposes applying an offset to the calibration characteristic curve.

DE 10 2004 008 796 A1, which is incorporated herein by reference, discloses a method and an apparatus for controlling a hydraulic valve of a hydraulic system, in which method an opposing force is generated at a solenoid valve, which is actuated by a brake control system, in order to damp noise by the valve coil being electrically excited at a suitable frequency. The method relates to pressure control methods in which the pressure is increased and reduced by means of valves which are switched in accordance with a pulse sequence.

SUMMARY OF THE INVENTION

An object of the invention is to improve the comfort and the control accuracy of a pressure control unit.

The invention relates to a control valve conditioning method in an electrohydraulic pressure control unit having at least one electrically actuated solenoid valve which is controlled in an analog manner. The control valve is operated at a specific operating current in accordance with a functional relationship or characteristic map between the valve current and the differential pressure characteristic curve, said functional relationship or characteristic map being stored in the pressure control unit, during a pressure control operation. The method comprises the following steps:
a) brief application of at least one antihysteresis pulse to the solenoid valve, during which antihysteresis pulse a current is set either far below the operating current or far above the operating current in the valve, with
b) the antihysteresis pulse being applied at the desired operating current before or during the control operation, in particular before each increase in pressure and/or reduction in pressure, and with
c) the antihysteresis pulse being so short that the brake pressure remains largely unaffected by said antihysteresis pulse.

The antihysteresis pulse preferably has a length of at most 100 ms, in some embodiments at most 50 ms.

In some embodiments, the current is at least 50%, in particular at least 80%, higher or lower than the operating current during the antihysteresis pulse.

As explained in greater detail further below, it has been found that a hysteresis effect is present when a desired pressure is set by means of the coil current which is applied to the control valve. If, for example, the valve characteristic curve is evaluated in a laboratory under suitable conditions, the result is a hysteresis effect which is limited by an upper and a lower current/pressure edge curve. The determined upper current/pressure edge curve of the hysteresis range and/or the lower edge curve of the hysteresis range are/is stored in the electronics system of the pressure control unit.

The solenoid valve which is actuated in an analog manner is preferably a brake pressure control valve in an electrohydraulic brake pressure control apparatus. The valve which is open when no current is applied and which is very particularly preferably used as an isolating valve. The valve is actuated such that control operation is possible. The solenoid control valve is preferably actuated by a pulse-width-modulated current controller. So-called analogized switching valves are preferably used as the analog valve in the field of electronic brake systems.

The brake pressure control operation which is carried out by the pressure control unit is preferably a motor vehicle distance control operation.

The pressure control unit which is used for control purposes preferably does not have any pressure sensors for measuring the controlled hydraulic pressure.

The antihysteresis pulse is applied at least shortly before a change in the differential pressure to be adjusted and/or a change in the current to be adjusted, in order to be able to select a defined position on a stored valve characteristic curve.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
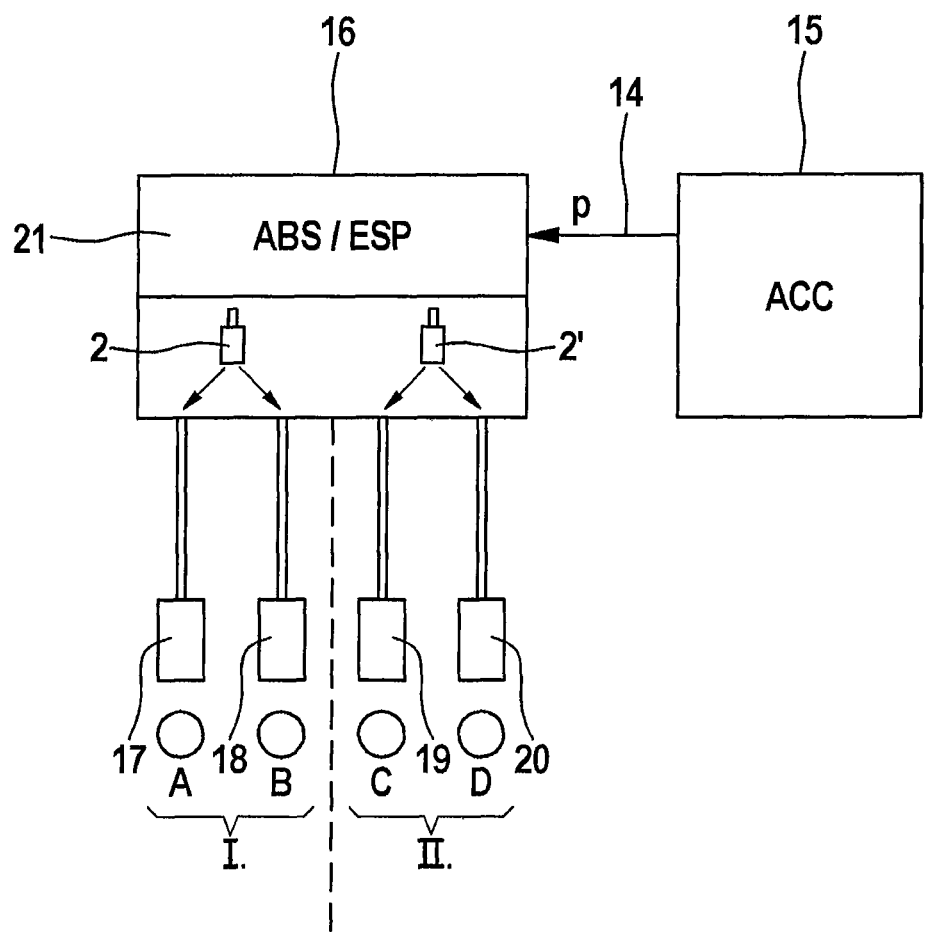
FIG. 1 shows a basic diagram of the pressure interface of a pressure control apparatus.

In the schematic illustration in FIG. 1, an external ACC controller 15 for distance control is connected to an ABS/ESP controller 16 by means of a pressure interface (symbolized by line 14). As an alternative, the ACC function can also be implemented within the controller 16 if said controller receives the sensor signals, which are required for ACC via separate inputs, so that said sensor signals are available. Inter-vehicle distance controller 15 forwards a pressure requirement signal to controller 16 via line 14. The control program 21 contained therein converts the pressure requirement into valve actuation signals, and therefore the pressure in the wheel brake actuators 17 to 20 is set in a suitable manner. During ACC operation, pressure is generally actively increased, that is to say a pump (reference symbols 1, 1' in FIG. 3) delivers pressure medium toward that side of the isolating valve 2 or 2' which faces the inlet valves. In this case, the isolating valve is supplied with a suitable current by an electrical current controller (PWM). The wheel brake circuits I. and II. can be filled with pressure in a metered manner in this way, with isolating valve 2 being used to control the pressure in circuit I. and isolating valve 2' being used to control the pressure in circuit II.

Figure 2:
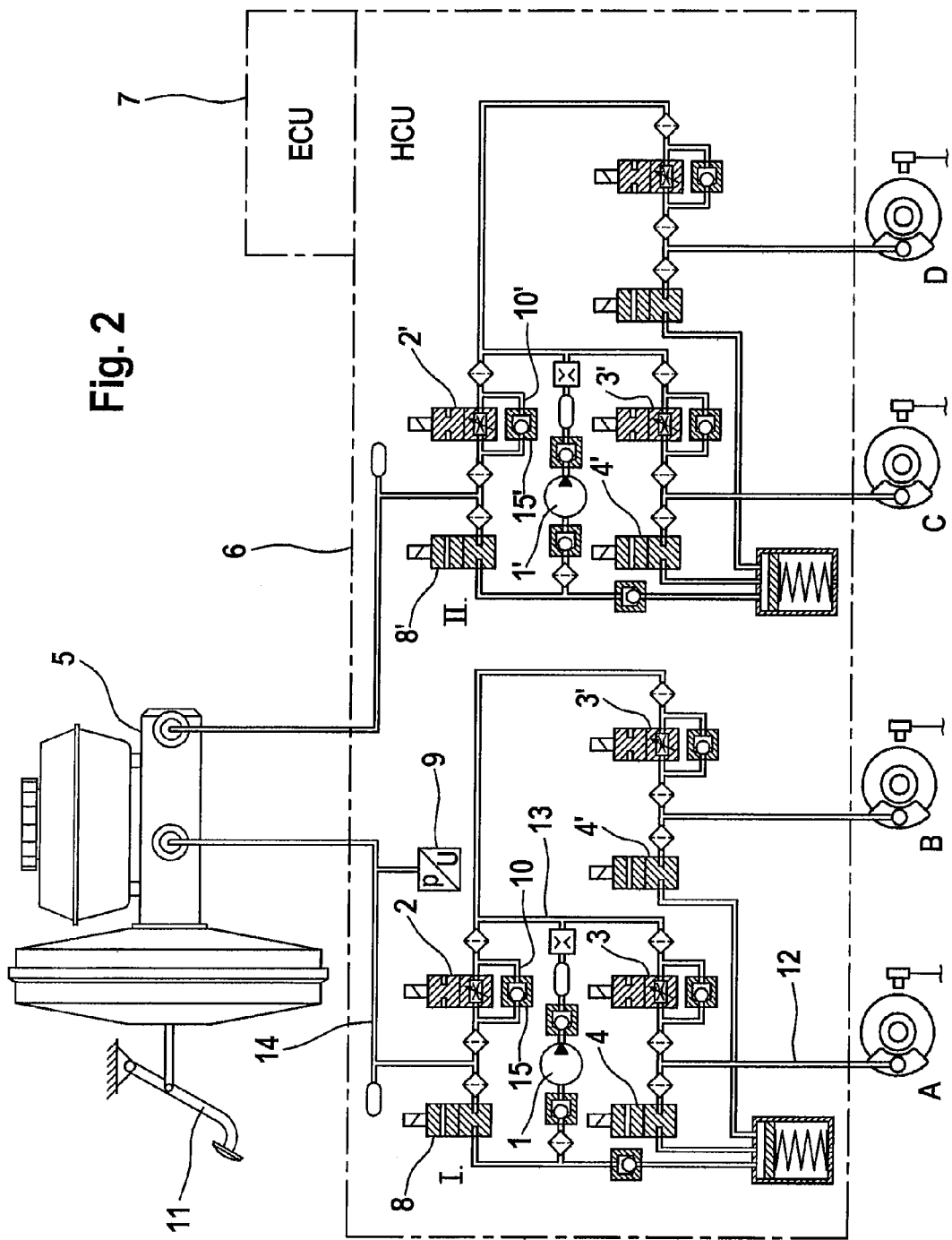
FIG. 2 shows a schematic illustration of a brake apparatus for ABS, ASR, ESP and additional control processes, such as ACC etc.

The structure of an exemplary pressure control unit for electronic brake systems is described below with reference to FIG. 2. Brake pressure is built up by the driver via tandem master cylinder 5. Tandem master cylinder 5 is connected to hydraulic unit 6 (HCU) of an electronic motor vehicle brake system. Electronic unit 7 (ECU) comprises a microprocessor system with which the actuators and sensors contained in the valve block can be electronically controlled and measured. Hydraulic unit 6 comprises two brake circuits I. and II. Furthermore, each of the brake circuits comprises in each case two wheel pressure circuits (A, B and C, D), each with an inlet valve 3 or 3' and an outlet valve 4 or 4'. The electronics system of the ECU 7 comprises a multi-channel current controller which allows independent control of the currents through the coils of the isolating valves 2, 2' which are open when no current is applied and the inlet valves 3, 3' which are open when no current is applied. Reference symbols 8 and 8' denote electronic changeover valves which are closed when no current is applied. The hydraulic line 8 which leads to master cylinder 5 contains an input pressure sensor 9. The illustrated brake system does not comprise any further pressure sensors in the wheel pressure circuits themselves. However, it is also possible, in principle, to arrange additional wheel pressure sensors there, but this is frequently not the case for reasons of cost. Pump 1 or 1' can be used to automatically increase the pressure during an inter-vehicle distance (ACC) control operation and in vehicle dynamics control operations (ESP), but also in ASR control operations and normal return of pressure medium in pressure reduction processes. If pump 1 is switched on, said pump delivers pressure volumes in the direction of line 13 toward isolating valve 2 and inlet valve 3. When inlet valve 3 is open, the pressure in the wheel brake can be metered, for example during the inter-vehicle distance control operation, by isolating valve 2 during control operation. In the process, the electronic changeover valve 8 is completely opened in the situation described here.

Figure 3:
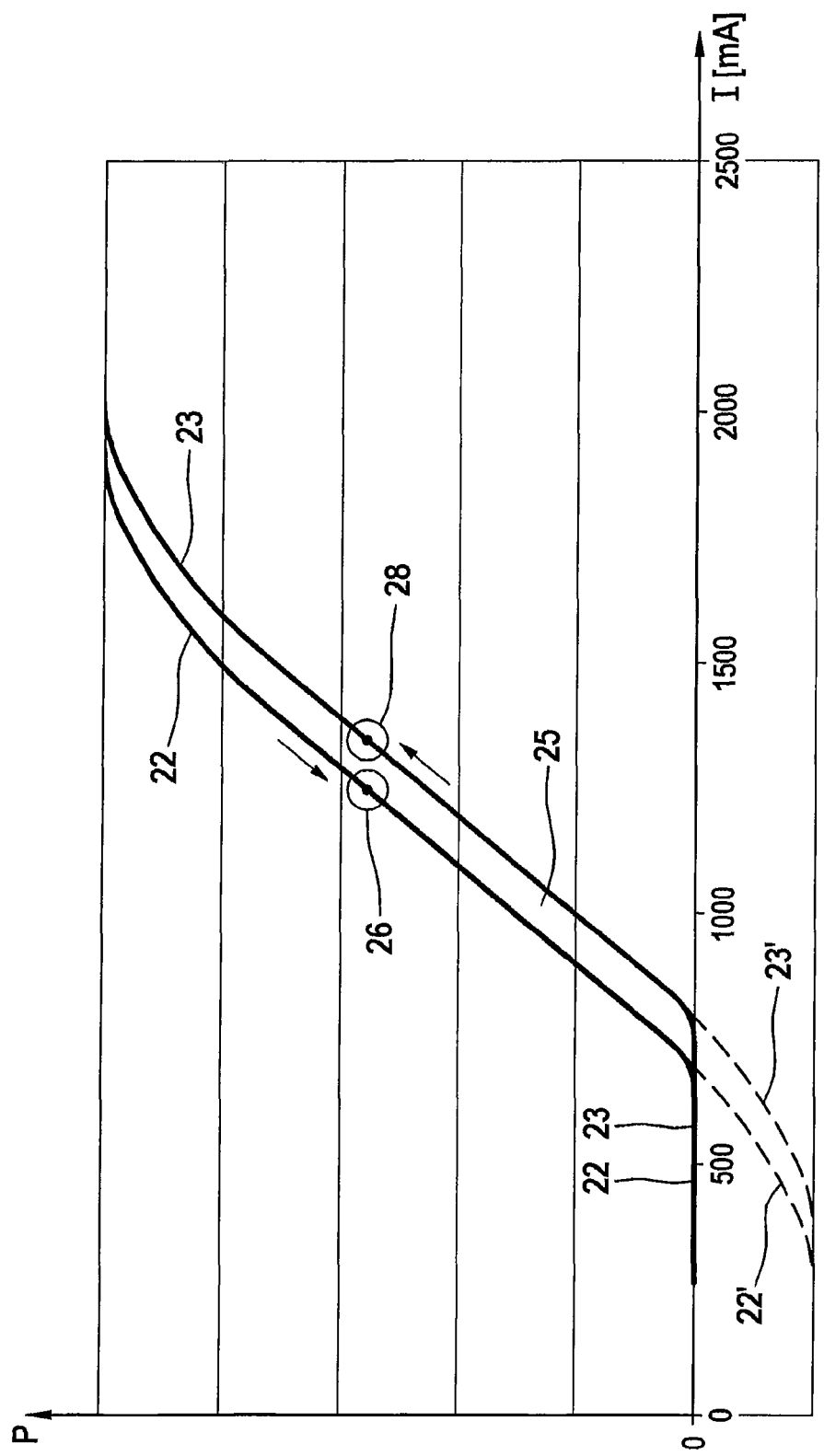
FIG. 3 shows a graph plotting the coil current for the isolating valve as a function of the pressure requirement.

The curves 22 (upper current/pressure edge curve) and 23 (lower current/pressure edge curve) in FIG. 3 represent the relationship, which is measured in a laboratory, between the coil current I for the isolating valve 2 or 2' and the differential pressure P which is applied to the valve when the curves are completely run through in a rising manner starting from current 0 or in a falling manner starting from maximum current. For the purposes of the present patent application, maximum current is understood to be the current at which the curves 22 and 23 substantially completely coincide in the direction of rising currents (saturation current). At least curve 23 is stored in a read-only memory of the electronics system of the pressure control unit. On account of the physical valve properties, such as mechanical and magnetic hysteresis, the curve profile P(I) depends on the previous history. Similarly to the magnetization curve of a permanent magnet, curve 22 represents the pressure profile when the pressure is lowered to a current of 0 A starting from the maximum possible valve current. In the case of the isolating valve, curve 22 or 23 can also be a designated so-called opening current characteristic curve. Starting from a current of 0 A, the result, in the case of a rising current, is curve 23 which is situated slightly below at somewhat lower pressures. Curves 22 and 23 define the edge of the hysteresis range 25. In a current range of below approximately 700 mA, curves 22 and 23 coincide. In FIG. 2, the curve profiles 22' and 23' are still shown in the current range below 700 mA. Depending on the type of valve present, the curves can also coincide below 700 mA. The curve profiles 22' and 23' correspond to the mathematical continuation of the hysteresis curve, these not having any technical significance on account of negative pressure values not being present. On account of the hysteresis in the curve profile of the pressure/current characteristic curve of the valve, a clear relationship between the pressure and current cannot be established given valve control, which is carried out by the pressure control unit, without pressure sensors which set a specific differential pressure in accordance with a characteristic curve (for example opening current characteristic curve) by means of the valve current. It may be the case, for example, that with an unclear previous history, for example when the current is reversed at point 26, the curve profile of the pressure/current relationship is in a region between curves 22 and 23 which is not defined further. On account of the unclear characteristic curve, the differential pressure actually set cannot be clearly predicted, as a result of which inaccuracies are produced during control operation or when the pressure is set, it being possible to avoid these inaccuracies using the method according to aspects of the invention.

According to one example for carrying out the method according to aspects of the invention, the current through the valve coil is reduced to zero for a period of approximately 0.2 to 100 ms, in some embodiments 1 to 10 ms before a desired differential pressure (for example point 28 on curve 23) is set (antihysteresis pulse). Negative current values for an antihysteresis pulse would likewise be conceivable, but generally cannot be realized with the current controllers used. The current is then immediately increased to the current value which is associated with point 28 for the actual control operation. In principle, point 26 on curve 22 can also be assumed by generating a short current pulse of corresponding duration at a maximum current of 2000 mA. The application of a hysteresis pulse to the valve ensures that the characteristic curve corresponds to the curve 23 known to the control unit, for example stored in the memory. During practical operation, this leads to a considerable improvement in control accuracy. According to the first exemplary embodiment, curve 23 is stored in the brake unit. In addition or as an alternative, curve 22 can also be stored in the controller.

The invention claimed is:

1. A control valve conditioning method in an electrohydraulic pressure control unit comprising at least one electrically actuated solenoid valve which is controlled in an analog manner and is operated at a specific operating current in accordance with a functional relationship or characteristic map between the valve current and the differential pressure characteristic curve, said functional relationship or characteristic map being stored in the pressure control unit, during a pressure control operation, said method comprising the steps of:
   a) applying at least one antihysteresis pulse to the solenoid valve, during which antihysteresis pulse a current is set either below the operating current or above the operating current in the valve,
   b) applying the antihysteresis pulse at the desired operating current before or during the control operation,
   c) applying the antihysteresis pulse in such a short time that the brake pressure remains largely unaffected by said antihysteresis pulse, and
   d) applying the antihysteresis pulse before each increase in pressure and reduction in pressure.

2. The method of claim 1, wherein the antihysteresis pulse has a length of less than 100 ms.

3. The method of claim 1, wherein the antihysteresis pulse has a length of less than 50 ms.

4. The method of claim 1, wherein the current is at least 50% higher or lower than the operating current during the antihysteresis pulse.

5. The method of claim 1, wherein the current is at least 80% higher or lower than the operating current during the antihysteresis pulse.

6. The method of claim 1, wherein the solenoid valve is a brake pressure control valve in an electrohydraulic brake pressure control apparatus.

7. The method of claim 6, wherein the solenoid valve is a valve which is open when no current is applied.

8. The method of claim 7, wherein the solenoid valve is an isolating valve.

9. The method as claimed in claim 1, wherein the solenoid control valve is actuated by a pulse-width-modulated current controller.

10. The method as claimed in claim 1, wherein the brake pressure control operation is a motor vehicle distance control operation.

11. The method as claimed in claim 1, wherein the pressure control unit which is used for control purposes does not have any pressure sensors for measuring the controlled hydraulic pressure.

\* \* \* \* \*